United States Patent
Marcjan et al.

(10) Patent No.: US 7,680,810 B2
(45) Date of Patent: Mar. 16, 2010

(54) LIVE GRAPHICAL PREVIEW WITH TEXT SUMMARIES

(75) Inventors: Cezary Marcjan, Redmond, WA (US); Ryszard K. Kott, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/095,047

(22) Filed: Mar. 31, 2005

(65) Prior Publication Data

US 2006/0230055 A1    Oct. 12, 2006

(51) Int. Cl.
*G06F 7/00*    (2006.01)

(52) U.S. Cl. .................... 707/102; 709/217; 709/228

(58) Field of Classification Search .................. None
See application file for complete search history.

(56) References Cited

U.S. PATENT DOCUMENTS

| | | | |
|---|---|---|---|
| 5,898,836 A | 4/1999 | Freivald et al. | 395/200 |
| 5,983,268 A | 11/1999 | Freivald et al. | 709/218 |
| 6,151,624 A * | 11/2000 | Teare et al. | 709/217 |
| 6,275,820 B1 * | 8/2001 | Navin-Chandra et al. | 707/3 |
| 6,477,575 B1 * | 11/2002 | Koeppel et al. | 709/224 |
| 6,594,654 B1 * | 7/2003 | Salam et al. | 707/3 |
| 6,697,821 B2 * | 2/2004 | Ziff et al. | 707/104.1 |
| 7,076,504 B1 * | 7/2006 | Handel et al. | 707/104.1 |
| 7,085,997 B1 * | 8/2006 | Wu et al. | 715/201 |
| 7,165,098 B1 * | 1/2007 | Boyer et al. | 709/219 |
| 7,171,414 B1 * | 1/2007 | Nazem et al. | 707/10 |
| 7,284,008 B2 * | 10/2007 | Henkin et al. | 707/102 |
| 2002/0107735 A1 | 8/2002 | Henkin et al. | |
| 2002/0129364 A1 * | 9/2002 | Smith et al. | 725/37 |
| 2002/0135617 A1 * | 9/2002 | Samid | 345/764 |
| 2003/0014443 A1 * | 1/2003 | Bernstein et al. | 707/513 |
| 2003/0093794 A1 * | 5/2003 | Thomas et al. | 725/46 |
| 2003/0106022 A1 | 6/2003 | Goodacre et al. | 715/513 |
| 2003/0163547 A1 * | 8/2003 | Beisty et al. | 709/217 |
| 2004/0003097 A1 * | 1/2004 | Willis et al. | 709/228 |
| 2004/0135819 A1 * | 7/2004 | Maa | 345/840 |
| 2004/0181753 A1 * | 9/2004 | Michaelides | 715/523 |
| 2004/0205185 A1 | 10/2004 | Leonik | 709/224 |

FOREIGN PATENT DOCUMENTS

EP    1653383 A    5/2006    .................. 726/28

OTHER PUBLICATIONS

European Search Report dated Sep. 8, 2006 and mailed Sep. 15, 2006, for European Application No. EP 06111671, 5 pages.

* cited by examiner

*Primary Examiner*—Don Wong
*Assistant Examiner*—Shyue Jiunn Hwa
(74) *Attorney, Agent, or Firm*—Lee & Hayes, PLLC

(57)    ABSTRACT

The subject invention provides a unique system and method that facilitates creating a summary page of content associated with disparate sources of data. For example, a user can select one or more regions of one or more disparate web pages for which he/she desires updated information over a length of time. The selected regions can be identified and then marked for monitoring via a web crawler. The web crawler can analyze the relevant web pages, and in particular, only the selected regions to determine if any of the corresponding content have changed. Changes to other non-selected content can be ignored. The desired changes can be extracted and included on the summary page to mitigate the number of times a user must revisit individual web pages to see what if any changes have occurred since the previous visit.

11 Claims, 10 Drawing Sheets

EXEMPLARY WEB PAGE LAYOUT – HOME PAGE 310

LIVE GRAPHICAL PREVIEW WITH TEXT SUMMARIES

TECHNICAL FIELD

The subject invention relates generally to web browsing and in particular to monitoring selected sites and feeding any updated content from those sites in summary form to the user to facilitate rapid access to the current information.

BACKGROUND OF THE INVENTION

In the past several years, the Internet or World Wide Web ("the web") has become a relatively common source of various types of news, information, and entertainment. For many users, the Internet is frequently searched and referenced as a research tool; while for others, the Internet operates more as a link to the unreachable—whether it is a product or service—that is perhaps only available to the user via the Internet.

Admittedly, Internet users can spend hours browsing through pages and pages on the web. Unfortunately though, much of that time may be undesirably consumed by revisiting particular web pages to see if any content on the page has changed. This is because traditional browsing systems include a history display that may remind the user of the web pages that he/she has visited within a given period of time. However, no other useful information can be obtained or extracted. Newer systems employ techniques to modify visualizations of the respective hyperlinks to inform the user that the content on the hyperlink has changed in some way. These systems may have their own limitations as well. Although such techniques can assist the user in determining which pages to revisit, they still require the user to click on the hyperlink to see or obtain the changes.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate creating a summary page of content associated with disparately located data including, but not limited to, web pages, files, streams, and/or collections of files or streams. More specifically, the user may identify regions of content associated with one or more web pages, for example, and those regions can be monitored and displayed on the summary page. Monitoring the web pages can be accomplished in part by employing a web crawler associated with the system. The web crawler can periodically analyze the web pages and determine if the content of interest has changed while ignoring other content not identified to be of interest. Any changes or updates to the desired content can be dynamically pulled and fed to the summary page so that the summary page can convey a near current state of the respective content of interest. The summary page can display text, images, and rich text and can alert the user of "new" information. In addition to monitoring a "live" or current source of data, a cached version can also be monitored at the same time as or separately from the live source.

According to an aspect of the invention, the desired content on any one web page can be selected by the user such as by highlighting the respective region or text. The selection can then be mapped to a corresponding table or structure for the particular page and then tagged or otherwise marked for monitoring.

According to another aspect of the invention, many different types of web-related content can be monitored for changes made thereto and summarized for the user on a separate site or page. Such content can be grouped or organized according to the type of content such as news, messages, photos, games, search, etc., which can improve the user's overall viewing experience.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
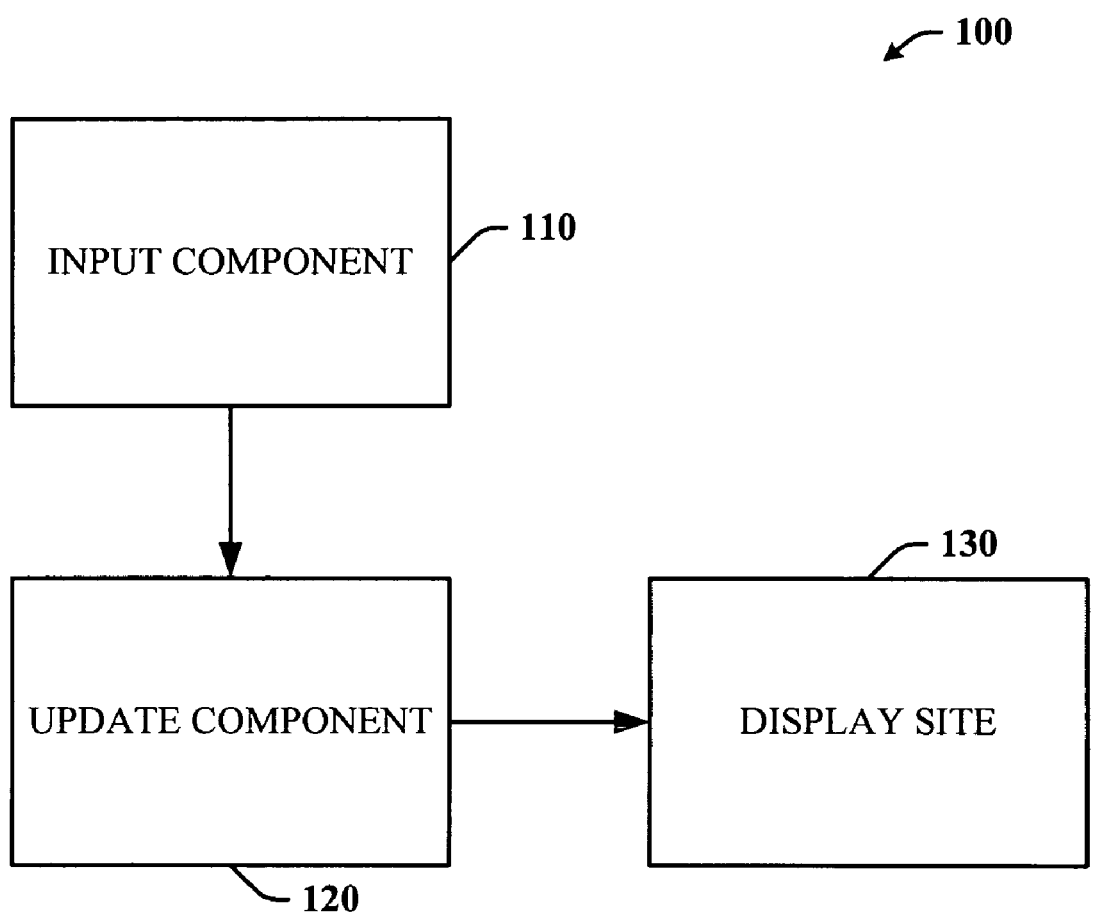
FIG. 1 is a high-level block diagram of a web page feed system that facilitates feeding updated information from one or more web pages to a display site in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with monitoring changes to desired regions of one or more disparate web pages and creating a summary page of such changes which have been extracted from the respective web pages. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For the ease of understanding, the subject invention as described below in FIGS. 1-10 relate to the context of monitoring web pages. However, it should be appreciated and understood that any source of data including but not limited to files, streams, and/or collections of files and/or streams can be monitored in the manner discussed to carry out the various aspects of the subject invention.

Referring now to FIG. 1, there is a high level block diagram of a web page feed system 100 that facilitates creating a summary page of selected content that is associated with one or more web pages in accordance with an aspect of the subject invention. The system 100 includes an input component 110 that can receive and process content which has been selected for monitoring and/or tracking by a user. In particular, the user can select any region of interest on one or more web pages for which monitoring is desired by an update component 120. The update component 120 can track and watch the selected regions to determine when changes are made thereto. When a change to that particular region (or content located therein) is detected, the new or updated information can be communicated to a display site 130.

The selected regions and/or the particular web pages can be identified and maintained on the display site 130 (e.g., summary page). The display site 130 can be in the form of another web page that may be accessible from any location and/or computing device or can be a separate file or controllable feature in a browser system. Thus, the display site can be scalable and somewhat dynamic in terms of the amount of information displayed to the user based at least in part on the type of computing device from which the user is accessing the site 120. For example, the amount of information provided per web page or per desired region on a web page can vary based on the device's screen size and/or memory capacity. On larger screens, more text and/or images may be displayed compared to smaller screens, which may display far less text and perhaps no images. Regardless of the user's screen size, the display site can adjust to provide an optimal context to the content, and thus the most meaningful information to the user.

Furthermore, the display site 130 is dynamic such that the content included therein changes as those regions of content on the respective web pages changes. As a result, the user is no longer tasked with revisiting each web page individually to see if any of their desired content has changed or been updated and/or to obtain the updated information.

Figure 2:
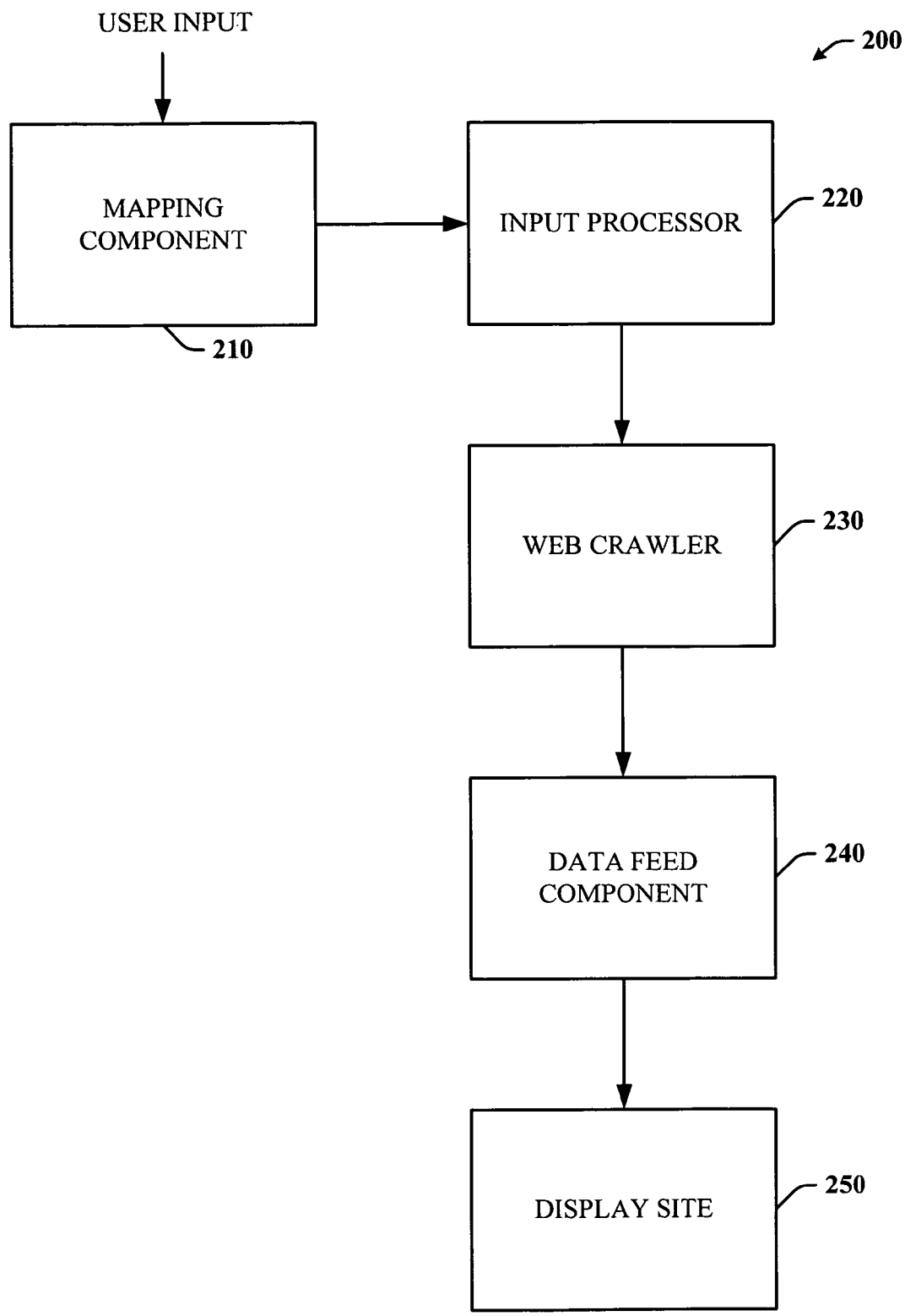
FIG. 2 is a block diagram of a web page feed system that facilitates feeding updated information from one or more web pages to a display site in accordance with an aspect of the subject invention.

Referring now to FIG. 2, there is illustrated a block diagram of a system 200 that facilitates monitoring one or more disparate web pages for changes to selected content thereon and dynamically maintaining a site including such changes or summaries of such changes. The system 200 includes a mapping component 210 that receives user input. For example, a user can select or choose which regions on a web page or which content (e.g., story, type of content on the page, etc.) to watch for changes thereto. Any change to the content (e.g., text, words, and/or images) can be referred to as a change in the content's state or status.

The mapping component 210 correlates the user's input with the structure or layout of the web page in order to facilitate identifying the specified regions to monitor. The user is not required to understand the structure of the web page but must merely choose the content or region(s) on the page for which monitoring is desired. The mapping component 210 can resolve the physical structure of the web page, for example, by learning a plurality of structures or layouts and then by finding a closest match to the relevant web page. For example, most news-related web pages are structured in a similar manner as are many e-commerce web pages.

Following, an input processor 220 can analyze the user's input together with information received from the mapping component 210 in order to determine and/or identify the one or more regions. Once the desired content has been identified, it can be communicated to a web crawler 230. In this respect, the web crawler 230 can act as a personal crawler for each user by perusing through only those web pages indicated by the user and then by detecting a delta between a previous form of the content and a current form of the content. If a delta, or difference, is detected, the current form of the content on the web page can be captured or extracted and communicated to a display site 240 via a data feed component 250. In some cases, it may be desirable to establish a threshold for delta before feeding presumably updated information to the display site 240. For example, at a minimum, a correction of punctuation may be sufficient to constitute a change between the previous form and the current form. However, the user may be uninterested in such a minor or insignificant change. Therefore, the user can set a minimum threshold which must be satisfied before the current form of the content is fed through to the display site 240. For instance, a minimum number of characters may be required to change such as 5 or 10 characters.

The data feed component 250 can continuously stream any current or near current content from the respective web pages as it becomes available to the display site 240. It should be appreciated that the previous form of the content can be determined by the user's initial input into the system and/or by the "current" content previously listed on the display site 240. In addition, the display site 240 can be shown in a graphical or textual manner depending on user preferences.

Figure 3:
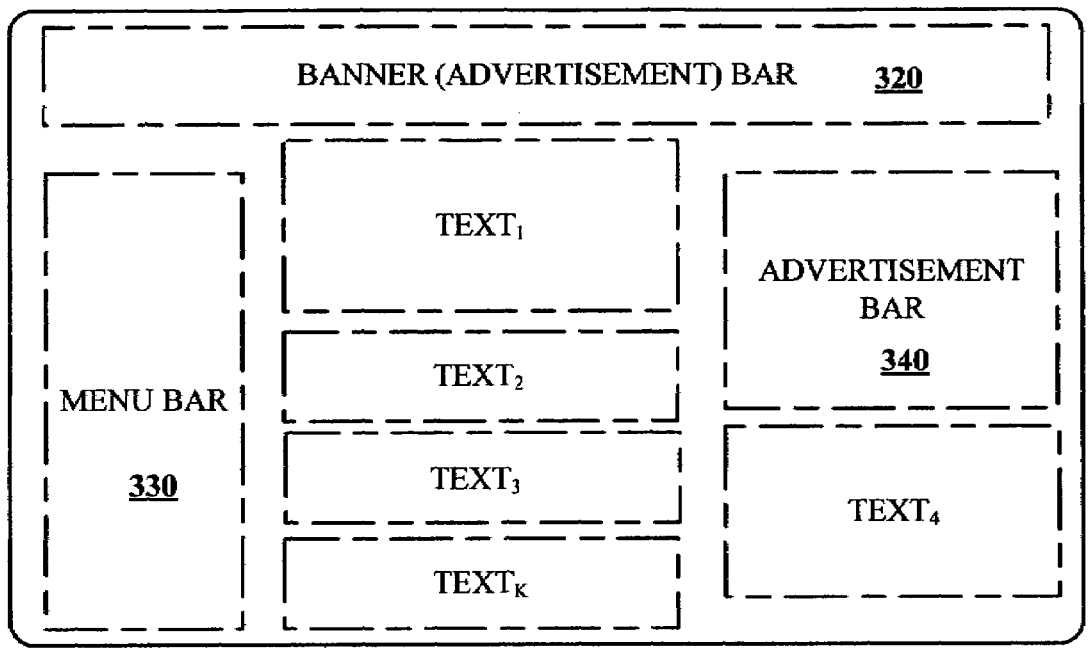
FIG. 3 is a schematic diagram demonstrating an exemplary web page layout of an exemplary web page in accordance with an aspect of the subject invention.
Figure 3:

Turning now to FIG. 3, there is a schematic diagram shown of an exemplary mapping of a typically-formatted web page in accordance with an aspect of the subject invention. The figure illustrates an example of a physical layout 310 of a web page. In particular, the layout 310 is of the home page of an exemplary news-related web site (350). As can be seen, the layout 310 includes a banner advertisement bar 320 positioned at the top end of the page, a menu bar 330 aligned vertical to the left side of the page, another advertisement (ad) bar 340 aligned to the right of the page, and various text regions (e.g., $TEXT_1$, $TEXT_2$, $TEXT_3$, $TEXT_4$, and/or up to $TEXT_K$, where K is an integer greater than or equal to one) primarily down the middle or near middle of the page.

The relative location of certain text regions on the web page can reflect their overall level of importance. For example, the uppermost text region of a news-related web home page is typically a news story having the most importance at the time of its release or a brief listing and/or synopsis of the major news headlines. In fact, users have learned and/or been trained that when reading a news-related web page, information that is deemed to be the most important by the news provider can almost always be found near or at the top of the page but just below any banner advertisements or the banner bar, in general.

Figure 4:
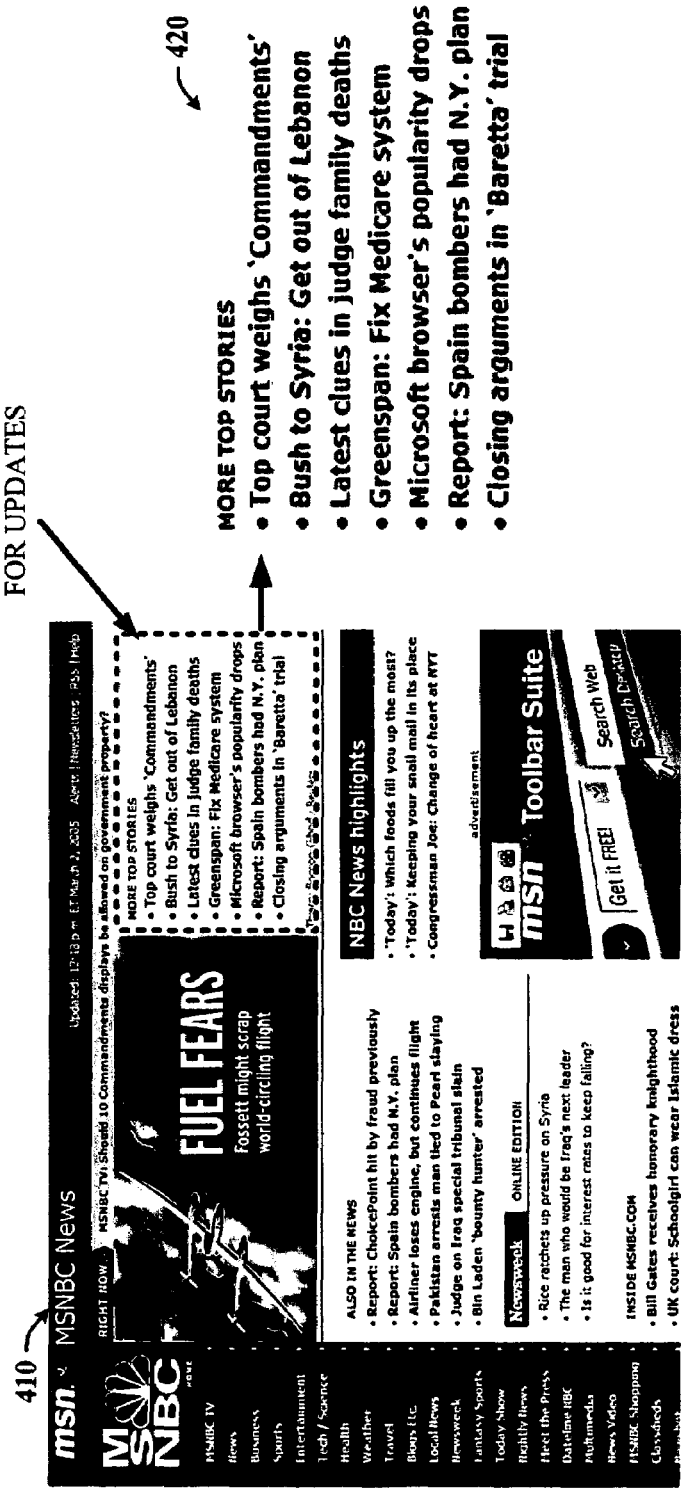
FIG. 4 is an image of an exemplary web page—a portion of which has been selected for monitoring updates made thereto in accordance with an aspect of the subject invention.
Figure 5:
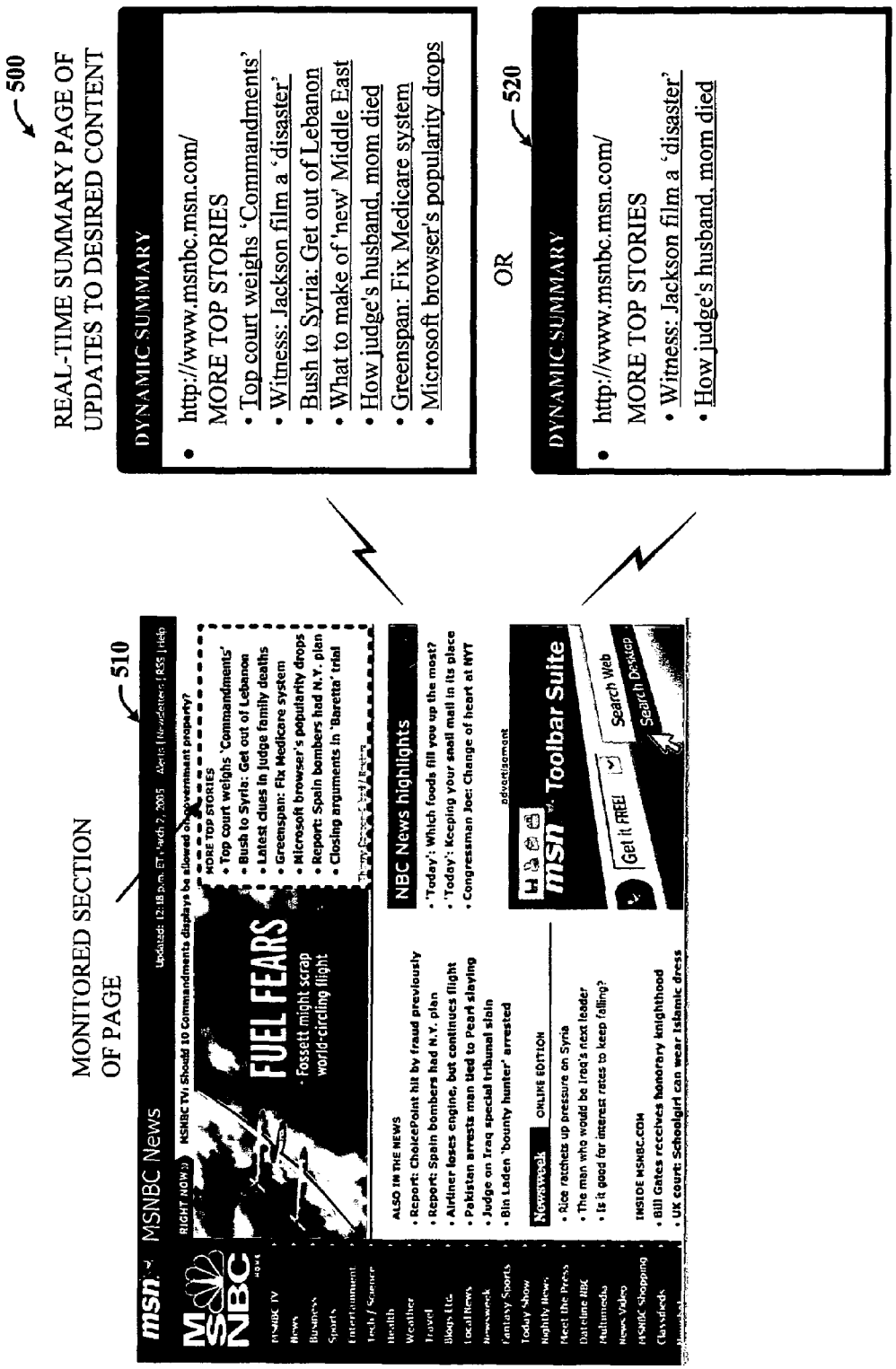
FIG. 5 is a schematic diagram of an exemplary summary page based on a selected region of a web page in accordance with an aspect of the subject invention.

Regarding the exemplary web page 350, imagine that a user wants to be notified of changes to the main Newsweek story. Accordingly then, the user can select the Newsweek box or text and/or images included therein. This selection maps to the $TEXT_1$ box and is identified as such to a web crawler for monitoring purposes. FIGS. 4-5 further demonstrate this aspect of the subject invention.

As shown on another exemplary news web page 410 in FIG. 4, a user has selected the outlined (in red) section or portion of the page to monitor for updates made thereto. The selected section 420 can be identified as the "More Top Stories" section of the page 410 to a web crawler or other monitoring component.

FIG. 5 demonstrates an exemplary summary page or site 500 that provides a user with updates to desired content selected and/or extracted from a respective web page 510 in a real-time or near real-time manner. For instance, suppose a user has selected a section (outlined in red) of the web page 510 to watch for updates (to the Top Stories) throughout the day. Any changes to the selected section can be conveyed to the user in at least two different ways via a summary page. In the first, the summary page 500 can display an extraction of the entire selected section when at least one change has been detected. Alternatively, however, the summary page (520) can include only the information which has changed from a previous time (e.g., new top stories) or which is different from what was previously viewed by or made available to the user.

Figure 6:
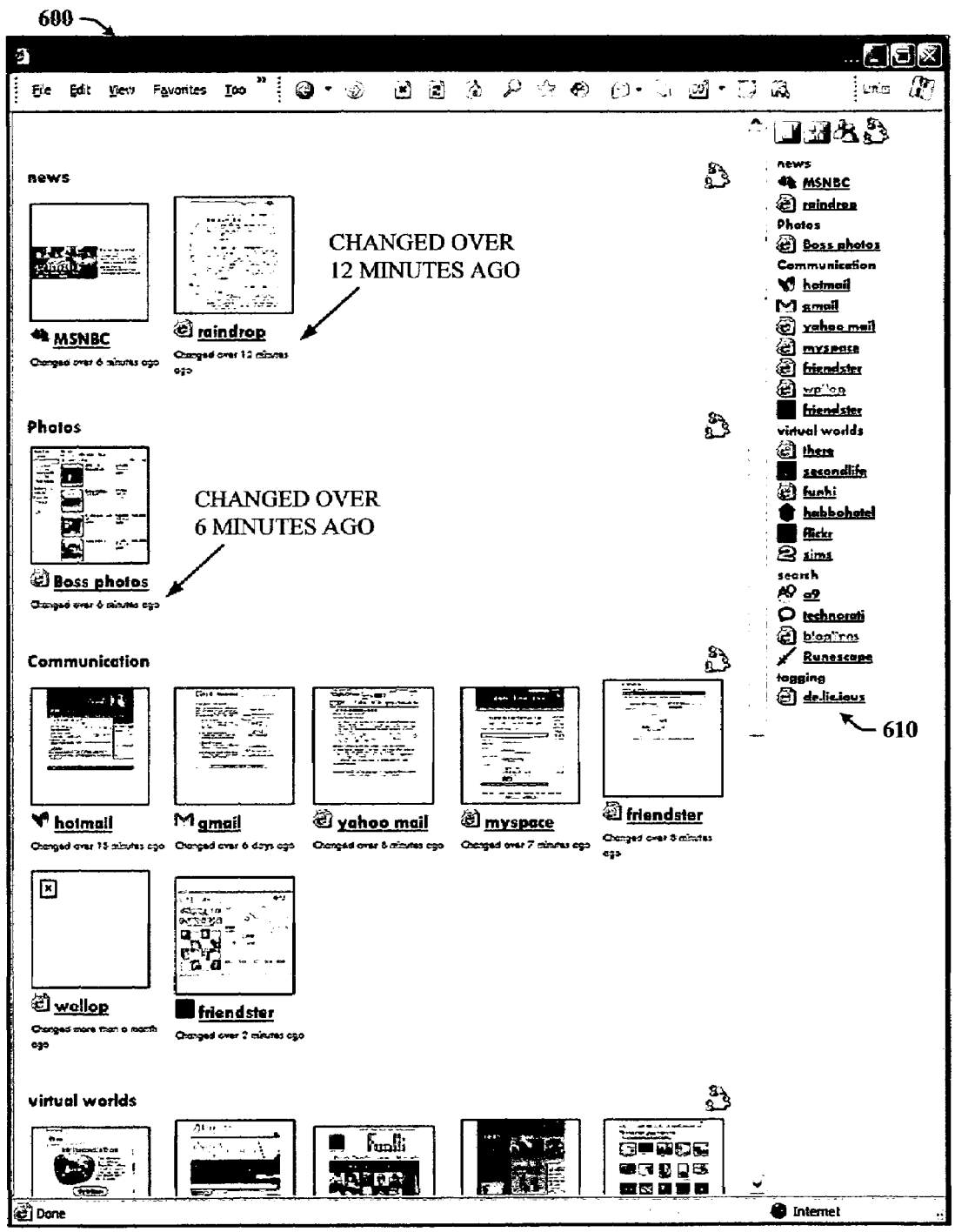
FIG. 6 is an image of an exemplary user interface that facilitates viewing a summary page of desired content extracted from disparate web pages in accordance with an aspect of the subject invention.

Multiple web pages can be monitored at or about the same time. Put another way, many different types of web-related content can be monitored and summarized in this manner. Hence, the user's summary page may include multiple listings of web pages under surveillance along with a caption of the content in its most current form. An exemplary user interface 600 demonstrating one version of a summary page in accordance with an aspect of the subject invention is shown in FIG. 6.

As indicated in this figure, various portions of multiple web sites have been selected or marked for update monitoring. The web sites can be grouped according to the type of information or the type of web site for easier viewing (e.g., news, photos, communication, search, etc.) and individually identified by site name or section of site name. In addition, a screen capture of each selected portion (of each web site) can be provided on the summary page and scaled according to the available display space. The information displayed in the screen capture can change as the requisite information changes to provide the user with a visual alert.

To one side of the user's display, a complete listing 610 of all web sites being monitored can also be maintained for the user. Such listing can be employed by the user to facilitate navigation between the sites and/or to act as a reminder of which sites are being watched. The various listings can automatically refresh or be updated at different times, depending on when any new information is detected and communicated to the summary page. To provide further context with respect to any updated information, the user can be given an approximate age of the last change in real time. For example, the information from one site may have been updated "over 6 minutes ago" whereas the information from another site might have been changed "over 12 minutes ago". Where applicable, the age can be indicated in any time denomination including, seconds, minutes, hours, days, weeks, months, and/or years.

When the user wishes to stop monitoring a site for updates, the site can be readily removed from the summary page. Alternatively, the user can set monitoring time periods per web site. For instance, the user may only wish to monitor a photo site for 2 months. When the 2-month period is reached, the site can be automatically removed from the summary page.

Figure 7:
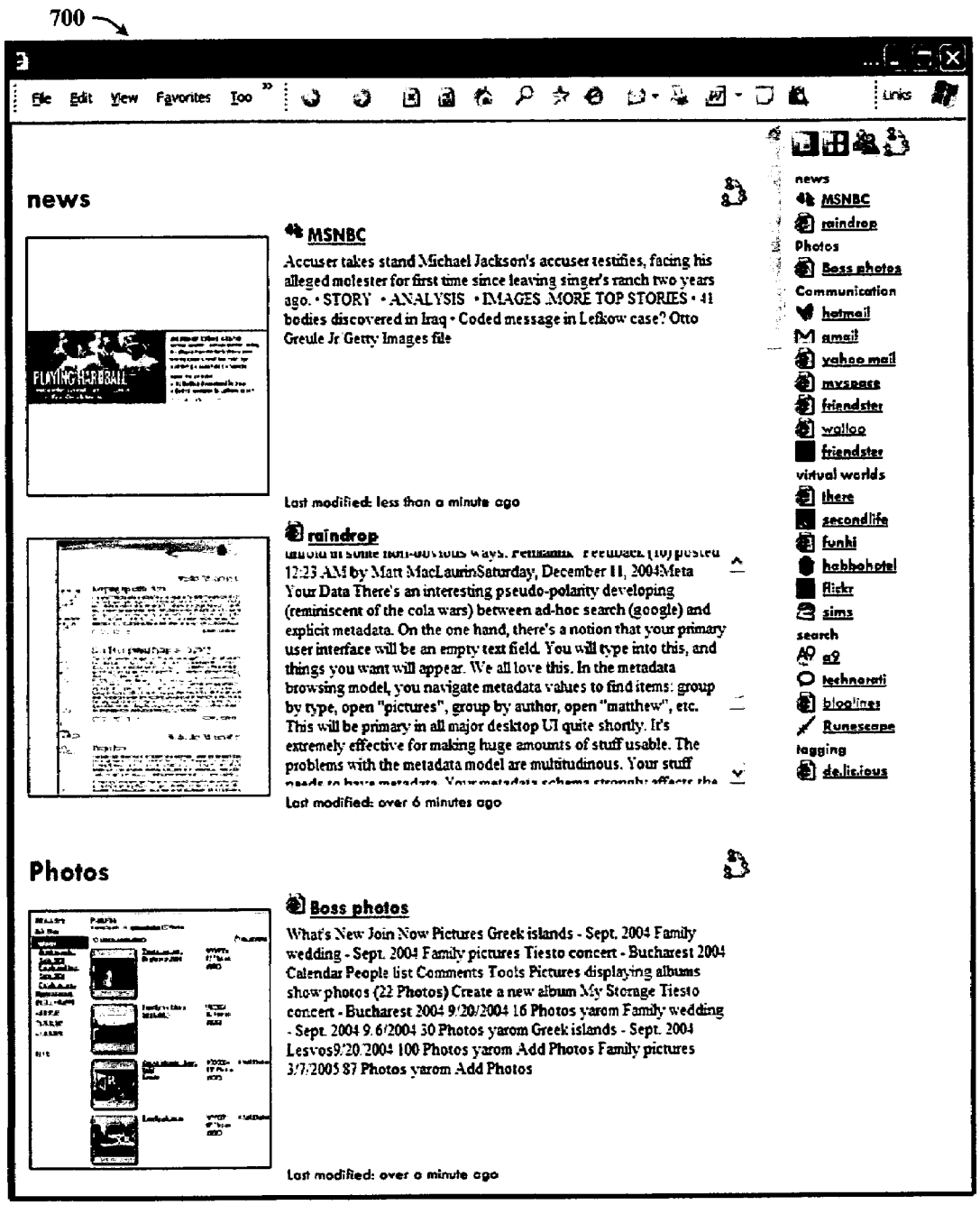
FIG. 7 is an image of an exemplary user interface that facilitates viewing a summary page of desired content extracted from disparate web pages in accordance with an aspect of the subject invention.

In FIG. 7, an exemplary user interface 700 is shown demonstrating an alternative view of the content displayed in FIG. 6, supra. In this particular view, the user can see more detail regarding each website or portion thereof that is being monitored. It should be appreciated that other views are also possible and such are contemplated to fall within the scope of the subject invention. For example, the user can choose to view each web site individually.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
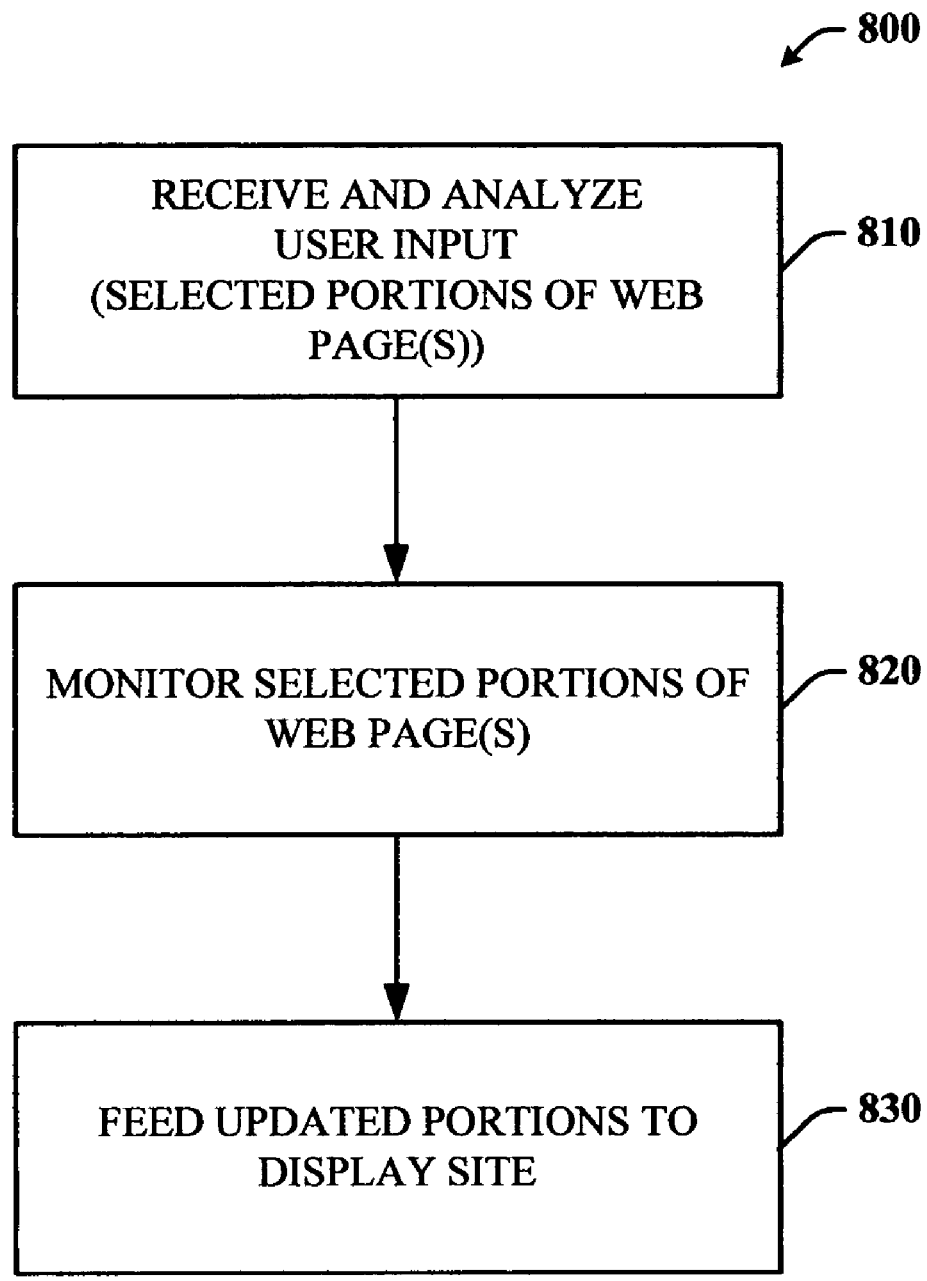
FIG. 8 is a flow chart illustrating an exemplary methodology for creating a summary page of desired content associated with disparate web pages in accordance with an aspect of the subject invention.

Referring now to FIG. 8, there is a flow diagram of an exemplary method 800 that facilitates creating a listing of changes as they are detected from one or more disparate web pages at least in part by feeding the detected changes to the listing. The method 800 involves receiving and analyzing user input at 810. User input can include the user's selected portions or regions of one or more disparate or related web pages. At 820, the selected portions of the one or more web pages can be monitored for changes. If any changes are detected in the selected portions, then those "updated" portions can be fed to a display site or page at 830. It should be appreciated that changes to content which may occur in other non-selected regions of the page can be ignored and thus do not trigger a feed of information from the web page to the display site.

Figure 9:
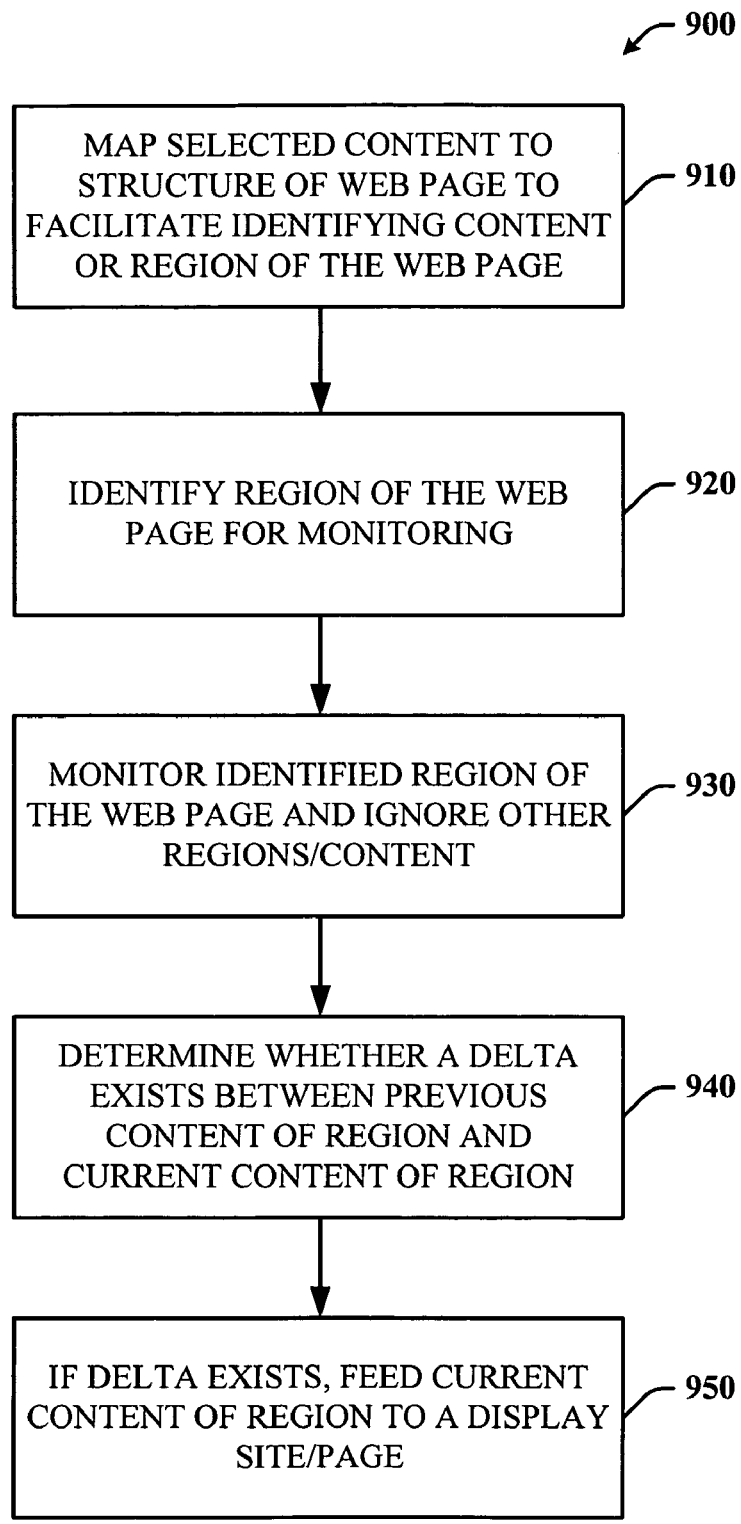
FIG. 9 is a flow chart illustrating an exemplary methodology for creating a summary page of desired content extracted from disparate web pages in accordance with an aspect of the subject invention.

Turning now to FIG. 9, there is a flow diagram of an exemplary method 900 that facilitates creating a summary page of desired content extracted from disparate web pages in accordance with an aspect of the subject invention. The method involves 900 mapping a user's selected content to a physical layout or structure (e.g., tree structure) of at least one web page at 910 to facilitate identifying such region of the web page. The user's initial selection of the content can be saved as well so that it can be compared to content located in that region of the web page at a later time.

At 920, the selected regions can be identified such as by name, label, or title for monitoring purposes. That is, once the selected regions are identified and associated with a particular section of the web page, such identified regions can be watched and/or examined at any interval of time by a web crawler at 930.

At 940, the method 900 can determine whether a delta exists between a previous capture of the selected content and a current view of the desired content. If a difference between the two is detected, then the desired content in the current view can be extracted therefrom and fed to a user's display site at 950. Thus, the user's display site may look more like a summary page that summarizes the most current status of any selected content of interest from a plurality of web pages, thereby mitigating the need to individually visit each site over and over again to be made aware of any changes or any updates to the selected content.

Figure 10:
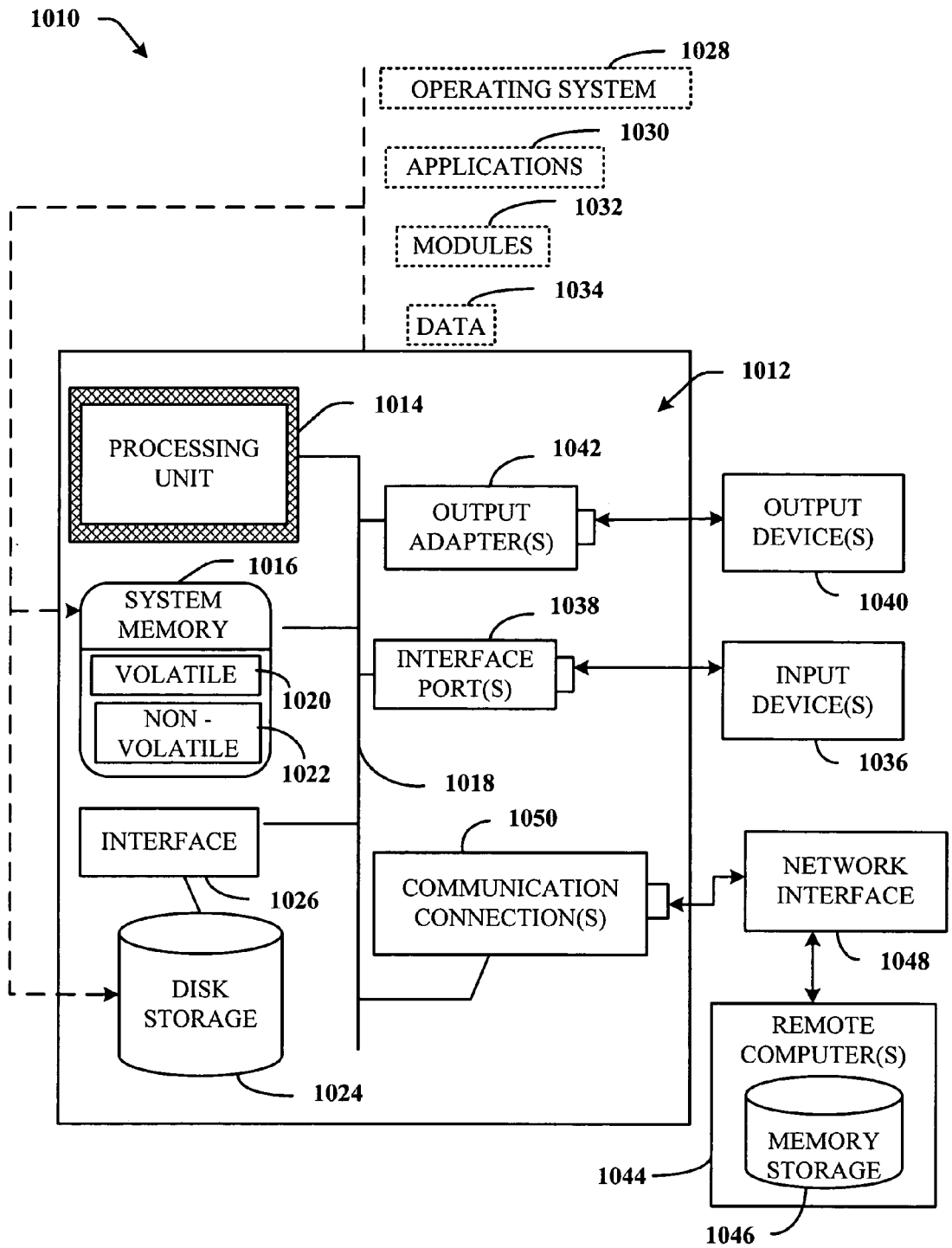
FIG. 10 illustrates an exemplary environment for implementing various aspects of the invention.

In order to provide additional context for various aspects of the subject invention, FIG. 10 and the following discussion are intended to provide a brief, general description of a suitable operating environment 1010 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus DRAM (DRDRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates creating live summaries of selected content across one or more disparate sources of data comprising:
    a processor, coupled to memory, that executes:
    an input component that receives at least one user-selected portion of at least one source document, the input component obtains content from the at least one source document associated with the at least one user-selected portion, wherein a user-selected portion comprises an identified region of the content from a source document, the identified region is selected to be monitored and displayed on a summary page;
    a mapping component that maps the at least one user-selected portion to at least one region in a physical structure of the source document to facilitate identifying content to monitor, wherein the physical structure of the source document is resolved by the mapping component to identify and to tag a match for the identified region corresponding to the source document;
    a display component that provides the summary page, the summary page includes the obtained content from the at least one source document associated with the at least one user-selected portion, wherein the obtained content for the user-selected portion is determined by the identified region;
    an update component that monitors and analyzes the at least one user-selected portion of the at least one source document to determine whether content from the at least one source document is different from corresponding content from the summary page associated with the at least one user-selected portion, the source content and summary page content are associated with a same user-selected portion, the update component updates the summary page to include the content from the at least one source document when the content from the at least one source document is updated and when it is different from the source content, extracting an updated content from the at least one source document, wherein when the updated content is found on the source document, the updated content is determined by the identified region and fed to the summary page;
    the update component that determines the source content is different from the summary content when a threshold is satisfied, wherein the threshold comprises a minimum character difference; and
    a data feed component that communicates the content in accordance with the user-selected portions of content to the summary page from a respective source document.

2. The system of claim 1, the update component comprises at least one web crawler that periodically analyzes content associated with the user-selected portion on the at least one source document.

3. The system of claim 1, the update component ignores non-selected content on the at least one source document.

4. The system of claim 1, the summary page comprises at least one of a file or page, whereby the summary page is scalable depending on a viewable surface of a display screen.

5. A method that facilitates creating live summaries of selected content across one or more disparate sources of data comprising:
    receiving at least one user-selected portion from at least one source document, wherein a user-selected portion comprises a region of content from a source document;
    mapping the user-selected portion to at least one region in a physical structure of the source document to facilitate identifying content to monitor, wherein the physical structure of the source document is resolved to identify and to tag a match for the region of content corresponding to the source document;
    obtaining content from the region of content corresponding to the at least one source document associated with the at least one user-selected portion, wherein obtained content is determined by the region of content;
    displaying the obtained content associated with the at least one user-selected portion on a summary page;
    monitoring and analyzing content on the at least one source document associated with at least one user-selected portion to determine whether the content is different from corresponding content displayed on the summary page;
    feeding the content in accordance with the user-selected portions of content to the summary page from a respective source document;
    dynamically replacing the corresponding content on the summary page when the content displayed on the summary page and the content, determined by the region of content, on the at least one source document, are different;

employing a threshold to determine whether the content on the at least on source document is different from corresponding content on the summary page, wherein the threshold comprises a minimum character difference.

6. The method of claim 5, farther comprising ignoring any non-selected portions of content.

7. The method of claim 5, feeding the content further comprising feeding a current state of the content to the summary page for each monitored source to facilitate mitigating revisiting each of the monitored sources on an individual basis.

8. The method of claim 5, further comprising scaling the summary page to display a current state of the user-selected portion of content to provide optimal context to the user in accordance with a viewable surface of a display screen.

9. The method of claim 5, further comprising accessing the summary page via a plurality of at least one of access locations and computing devices.

10. A computer-readable storage media storing computer-executable instructions that, when executed by a processor, facilitate creating live summaries of selected content across one or more disparate sources of data, comprising:

receiving at least one user-selected portion of content from at least one source document, the at least one source document comprises one or more web pages, the at least one user-selected portion of the content includes a region of the web page to be displayed and monitored on a summary page, the user-selected portion of the content can be identified by user input that highlights and tags respective regions of the one or more web pages;

mapping the user-selected portion of content to at least one region in a physical structure of the source document to facilitate identifying the selected portion of content to monitor;

displaying on the summary page the content associated with regions of the one or more web pages corresponding to the at least one user-selected portion, the summary page can include text or images, the means of displaying can comprise organizing the at least on user-selected portion of the content based upon type of the content;

monitoring and analyzing regions of the one or more web pages associated with the at least one user-selected portion of the content to determine whether a current state of content of the regions is different from the content displayed on the summary page, wherein the content determined by the region of the web page is obtained from the web page and compared with the content displayed on the summary page corresponding to the region, the content obtained from the web page and the content displayed on the summary page are associated with a same user-selected portion;

determining that the current state of the content is different from the content on the summary page when a threshold is satisfied, wherein the threshold comprises a minimum character difference;

feeding the content in accordance with the user-selected portions of content to the summary page from a respective source document; and dynamically updating on the summary page to include the current state of content when the current state is different from the content on the summary page, the dynamically updating comprise replacing the content on the summary page corresponding to the user-selected portion with the content reflected in the current state of the regions associated with the user-selected portion.

11. The computer-readable storage media of claim 10, feeding the content further comprising feeding the current state of the content to the summary page for each monitored source to facilitate mitigating revisiting each of the monitored sources on an individual basis.

\* \* \* \* \*